Dec. 1, 1931.  O. H. JENSEN  1,833,995
AIRCRAFT WING CONSTRUCTION
Filed Oct. 23, 1928   3 Sheets-Sheet 1
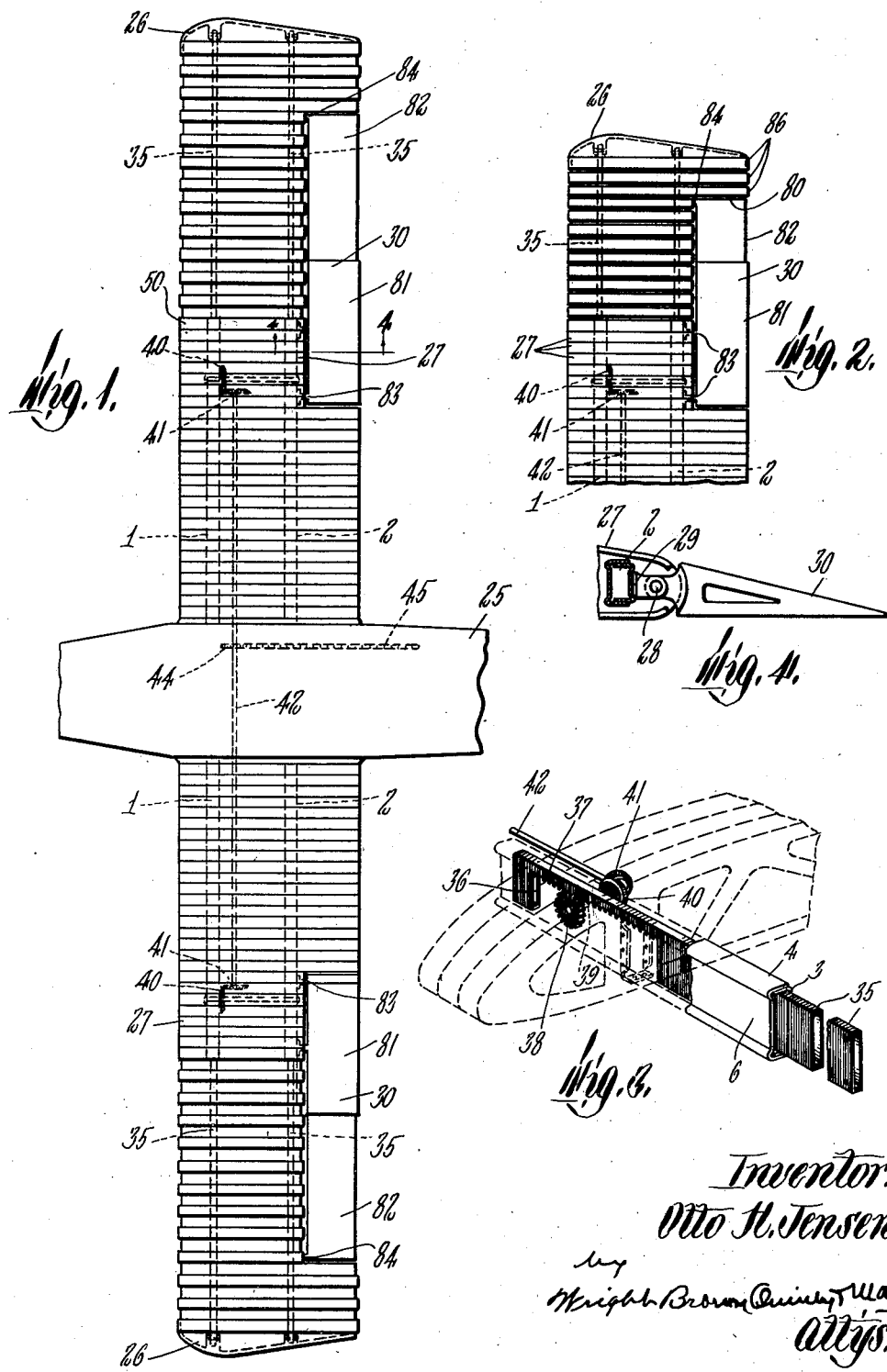
Inventor:
Otto H. Jensen,

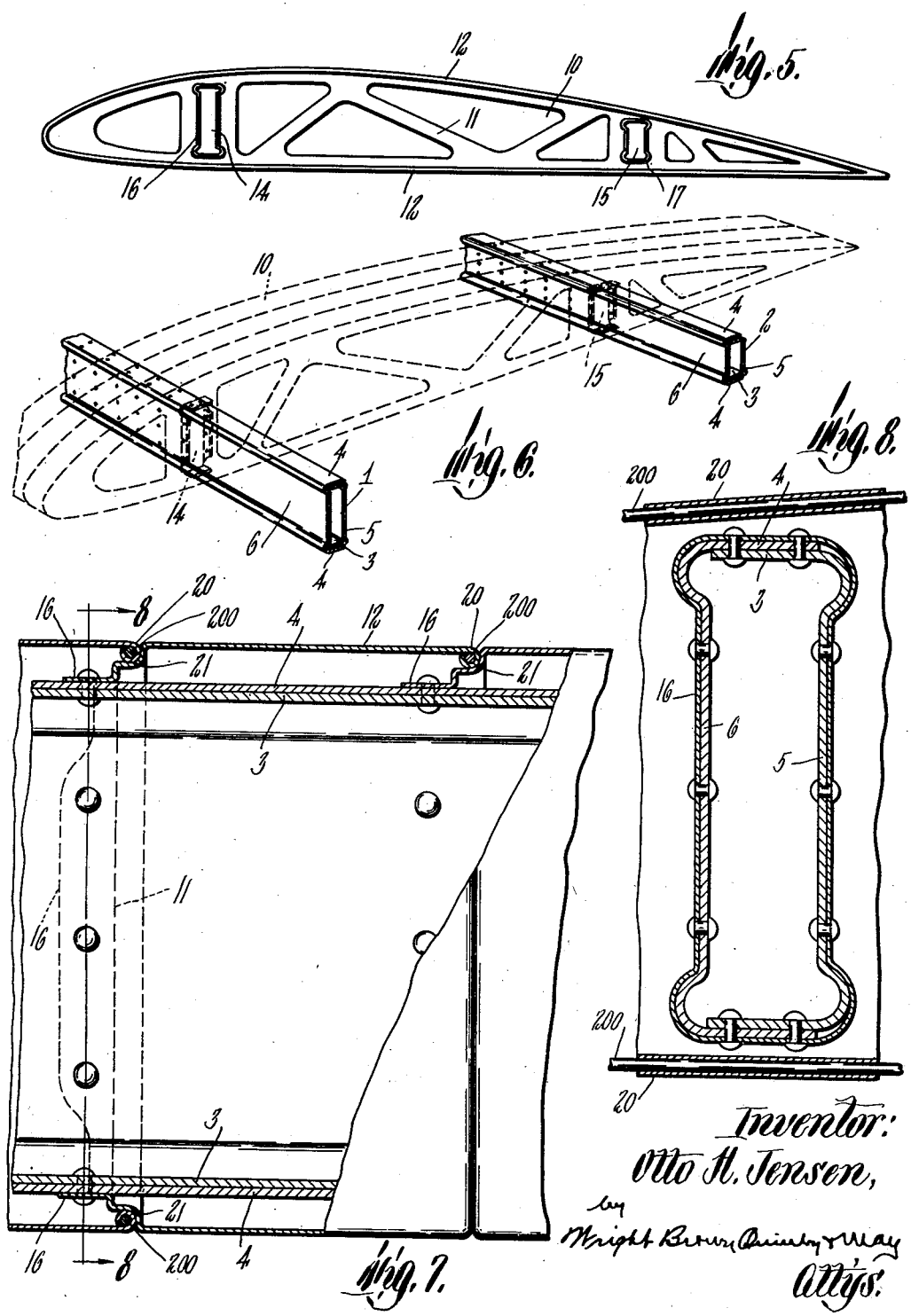

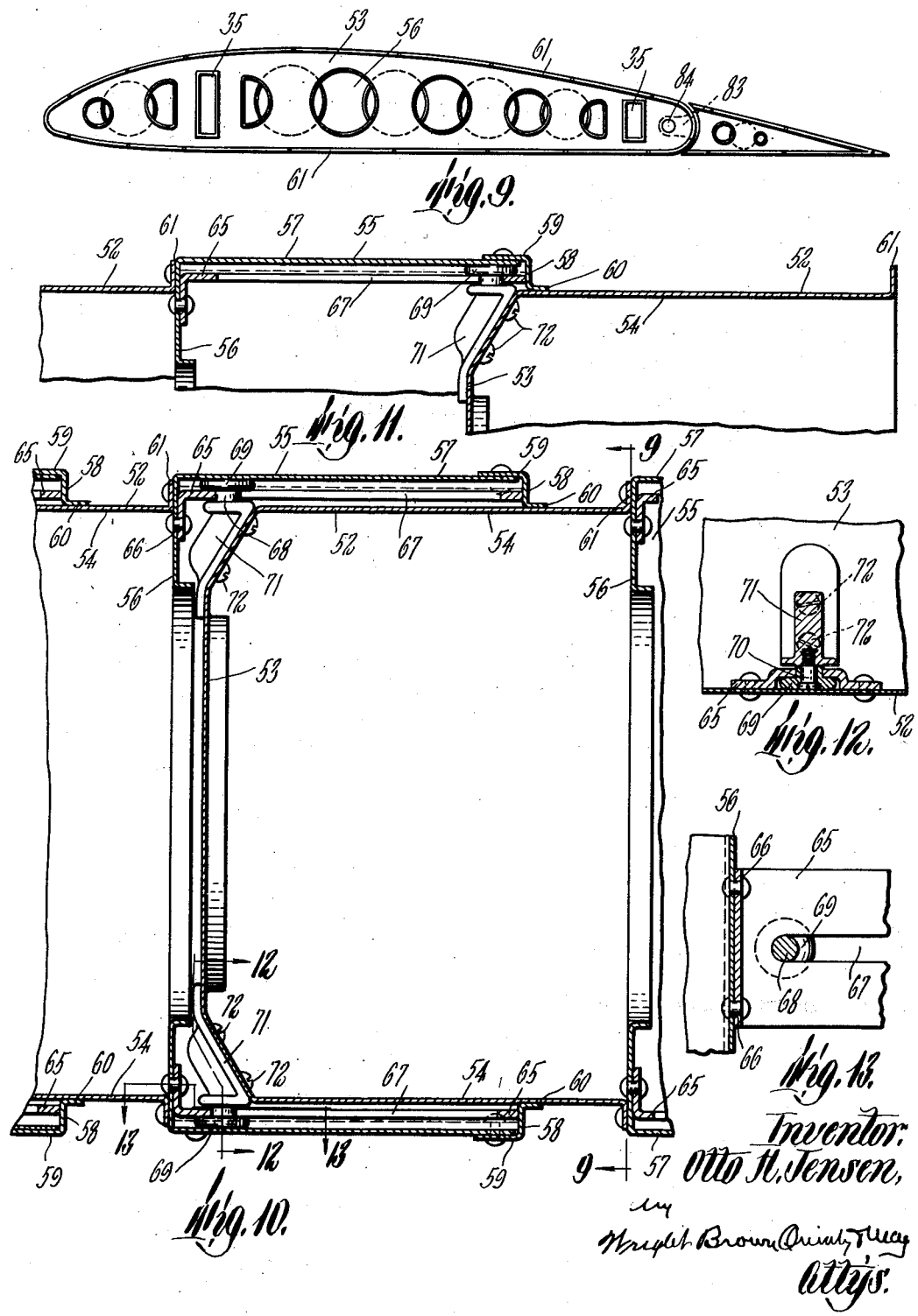

Patented Dec. 1, 1931

1,833,995

UNITED STATES PATENT OFFICE

OTTO H. JENSEN, OF UTICA, NEW YORK, ASSIGNOR TO THE BOSSERT CORPORATION, OF UTICA, NEW YORK, A CORPORATION OF NEW YORK

AIRCRAFT WING CONSTRUCTION

Application filed October 23, 1928. Serial No. 314,453.

This invention relates to wings for air craft and has for one of its objects to provide an all-metal construction which is rigid but very light in weight, and which can be readily repaired by substitution of new for damaged portions without requiring dismantling of the uninjured portions. To this end the wing is made of a series of pan-like metal sections, each having a base and a marginal flange, the flange forming a transverse section of the outside of the wing and the base forming a cross stiffening web which may be provided with openings to receive longitudinal frame pieces on which the sections are strung. The stiffener web may have openings at other places to decrease the weight of the sections if desired.

If desired, also, certain of these pan-like sections may be telescopically related and so mounted that they may be extended or contracted at will to vary the effective area of the wing. A larger area increases the lifting power of a craft at a given speed, but since it interposes additional friction, decreases the speed of the craft for a given power. The larger wing spread may be availed of at the take-off and on landing, since the craft will then lift at lower speed, while when the craft is well in the air the wing area may be decreased so that greater speed may be attained.

By forming the wings in sections as thus described, each forming a portion of the upper and lower surface of the wing, when the wing becomes damaged, which is usually at or adjacent to its outer end, the damaged wing sections may be removed and replaced by new ones without disturbing the remainder of the wing.

For a more complete understanding of this invention reference may be had to the accompanying drawings in which Figure 1 is a fragmentary plan of an airplane showing the wings constructed in accordance with this invention and in extended condition.

Figure 2 is a plan of the end portion of a wing in its contracted condition.

Figure 3 is a fragmentary perspective of an extension frame member showing the relation of the wing elements thereto in dotted lines.

Figure 4 is a fragmentary section on line 4—4 of Figure 1 but drawn to a larger scale.

Figure 5 is a side elevation of one of the wing sections or units drawn to the same scale.

Figure 6 is a diagrammatic perspective showing the manner of assembling of these units.

Figure 7 is a fragmentary section to a still larger scale longitudinally of the wing.

Figure 8 is a section on line 8—8 of Figure 7.

Figure 9 is a section on line 9—9 of Figure 10, but on a smaller scale.

Figure 10 is a view similar to Figure 7, but illustrating telescopically related sections in contracted position.

Figure 11 is similar to a portion of Figure 10, but showing the sections extended.

Figures 12 and 13 are detail sections on lines 12—12 and 13—13, respectively, of Figure 10.

Referring to the construction shown in Figures 1 to 7, at 1 and 2 are indicated hollow frame members of substantially box-like cross section which may be formed by fixing together marginal side flanges 3 and 4 of side plate members 5 and 6. Along these frame members 1 and 2 are threaded a series of pan-like sections or units, one of these being shown detached in Figure 5. Each of certain of these units, as at 10, is pan-like in construction comprising a central web 11 having a marginal flange 12 projecting from one face thereof about its entire periphery, each of these flanges being shaped to form a continuous transverse section about the periphery of the wing, forming portions of both the upper and lower faces thereof. The web 11 forms a transverse frame member for the wing, being provided with perforations, as at 14 and 15, to receive the frame members 1 and 2, these perforations as shown being provided with marginal flanges 16 and 17 which may be fixed to the frame members 1 and 2 as by riveting. The web 11 may be perforated in any desired way for the sake of lightness, the perforations being so disposed as not to materially interfere with the strength of these members as supporting frame elements for the surface flange portions 12.

As shown in Figure 7 the free edge of each flange portion 12 may be rolled inwardly as at 20 about a core rod 200 and the base portion of the flange adjacent to its union with the web 11 may be provided with a depressed seat 21 to receive the rolled edge portion 20 of the next adjacent unit butting thereagainst. Thus the surface portions of the flanges 12 may be made to form a substantially uninterrupted and continuous smooth exterior face for the wing. These sections may be arranged from the body of the air craft, which is shown at 25 in Figure 1, to an end member 26 shaped to the desired contour of the wing end, preferably, however, there being certain sections 27 (Figures 1, 2 and 4) closely adjacent to this end terminating forwardly of the rear extremity of the wing in order to form spaces in the rear edge of the wing to permit ailerons to be inserted as shown at 30 in Figures 1, 2 and 4. These may be pivoted as at 28 to brackets 29 fixed to the rear frame member 2, the marginal flange of the section 27 being cut away to permit the aileron to be rocked to the desired extent.

If desired, certain of the units or sections may be arranged in telescopic relation so that the effective area of the wing may be varied as previously described. Illustrative constructions for this purpose are shown in detail in Figures 1 to 3 and 9 to 13. Referring more particularly to Figures 1, 2 and 3, it will be seen that the frame members such as 1 and 2 extend only a part way from the inner end of the wing to the outer end and that telescopically related thereto are other frame members such as 35. The frame members 35 are formed to slide freely but without undue shake within the frame members 1 and 2 and each is provided therein with a cutaway portion 36 having rack teeth 37. Meshing with these teeth 37 is a rack pinion 38 fixed to a shaft 39 suitably journaled in the corresponding frame member 1 to 2. This shaft 39 is shown as provided with a bevel gear 40 meshing with a similar gear 41 on a shaft 42 extending longitudinally of the oppositely disposed pairs of wings. At any convenient point on this shaft is fixed some means by which it may be rotated by an occupant of the craft. This, for example, may take the form of a sprocket wheel 44 over which passes a chain 45 to any suitable actuating device convenient to the operator. By rotation of this shaft 42 it is evident that the frame members 35 may be moved in and out with relation to the corresponding frame members 1 and 2. To the outer end of the frame members 35 is fixed the end piece 26 of each wing and between this end piece and the outermost fixed section, as at 50, are positioned the telescopically arranged sections, such, for example, as shown in Figures 9 to 13. These telescopically arranged sections, as shown in these figures, are constructed in pairs. Thus the section 52 is provided with a web 53 and a marginal flange 54 extending from one face thereof. The section 55 comprises a web 56 and a marginal flange 57. The web 56 is of larger area than the web 53 so that the flange 57 may be telescopically related to the flange 54, as shown in Figures 10 and 11. The free end of the flange 57 is shown as provided with a marginal Z bar 58, one flange 59 of which is fixed to the flange 57, and the other flange 60 of which rides on the outer face of the flange 54. The outer end of the flange 54 is turned outwardly, as shown at 61, and is attached to the web 56 of one of the larger sections 55. A large section 55 and a small section 53 are thus fixed together as a unit, the flange 54 of the smaller section riding within the flange 57 of a larger section of the next adjacent unit. In order to slidably guide these telescopically related sections, while preventing them from becoming disassociated, a guide track comprising a plate 65 has one end fixed as at 66 to the web 56 of the larger section and extends over to the web of the Z bar 58. This plate 65 is formed with a guide slot 67 therein within which rides a small diameter portion 68 af a roller 69, mounted on a stub shaft 70 carried by a bracket 71 which is fixed as by screws 72 to an inclined outer margin of the web 53 inwardly of its flange 54. The slot 67 terminates short of the ends of the plate 65 and these closed ends serve as stops to limit the telescopic movement between the sections. In Figure 10 the parts are shown as in retracted position, while in Figure 11 they are shown as extended.

Where the ailerons are employed the flanged sections or units terminate somewhat short of the rear edge of the wing, as shown in Figures 1, 2 and 9, and within the openings 80 thus formed are pivotally mounted the ailerons 30. Where the wing is made extensible, as shown in Figures 1 and 2, these ailerons may also be made extensible. For this purpose, as shown, each comprises a pair of members 81 and 82 telescopically related. The member 81 may be pivotally connected as shown in Figure 4, to the frame member 2 and at spaced points, as shown at 83 in Figures 1 and 2, while the outer end of the member 82 may be pivoted to the outer telescopic short section at 84 as shown in Figure 9. Outwardly of the ailerons are shown full width telescopic sections 86. These may be formed as shown in Figures 9, 10 and 11, except that their rear ends will be extended to the contour of Figure 5 instead of having that shown in Figure 9.

Where it is not desired that the wing be extensible, the non-extensible units such as those illustrated in Figures 4 and 5 fixed to non-extensible frame units between the body of the craft and the end sections 26, and non-extensible ailerons will, of course, be used.

I claim:

1. A unit for air craft wing construction consisting of a pan-like sheet metal member comprising a central web having a broad marginal flange extending from one face thereof, said flange being shaped to the form of both the upper and lower wing surfaces, and said web having means by which it may be secured to a frame member, said unit being formed on the opposite face to receive the free edge of the flange of a similar element arranged in butting relationship to form with its own flange substantially continuous upper and lower wing surface portions.

2. An air craft wing comprising a series of pan-like sheet metal members, each member comprising a web and a marginal flange extending from one face of said web, said members having their webs arranged in parallel relation transversely with respect to the length of the wing, the spaces between webs of adjacent pairs of members being bridged by a flange of one of said members, the flanges presenting a substantially continuous surface for the upper and lower faces of the wing, and spaced frame elements passed through alined openings in the webs of said members and to which said members are attached.

3. An air craft wing comprising spaced longitudinal frame members, each frame member comprising telescopically movable related sections, cross members supported by said frame members, each of said cross members having wing surface portions, certain of said portions being telescopically related, and means for connecting said cross members and frame members to cause telescopic movement of said frame members to effect telescopic movement of said certain surface portions and thereby vary the effective size of said wing.

4. An air craft wing comprising spaced pairs of frame members, the members of each pair being telescopically related, cross members and surface portions fixed to one frame member of each pair, and an end member fixed to the outer end of each pair, telescopically related cross and surface members between said end and fixed cross and surface members, and means for preventing complete separation of said telescopically related cross and surface members.

In testimony whereof I have affixed my signature.

OTTO H. JENSEN.